Patented May 29, 1934

1,960,600

UNITED STATES PATENT OFFICE 1,960,600

METHOD OF SOIL FERTILIZATION

Robert Stewart and Victor E. Spencer, Reno, Nev.

No Drawing. Application July 31, 1930,
Serial No. 472,188

9 Claims. (Cl. 71—7)

Our invention relates generally to soil fertilization and has as a particular object the fertilization of the soil in such manner and with such materials as will obtain greatly improved impregnation of the soil in order that there may be available for plant consumption the maximum quantity of nutritive material.

Many of the soil fertilizers commonly used, when applied to the soil, undergo at once what is called "reversion", or "fixation"; that is, they become modified to an insoluble condition as soon as the solution of such materials comes in contact with the soil. This phenomenon is particularly true with regard to the so-called "available phosphates" such as superphosphate. As a consequence, applied phosphorus remains largely, if not entirely, in the plowed layer of soil, its distribution evenly through the soil mass being effected substantially entirely by the mechanical mixing incident to working the ground. Thus, such materials are limited in their distribution to the surface layer of the soil.

It is a well known fact that the root systems of most crop plants extend far below the plowed depth. Their feeding region is not limited, and in many cases is not even largely limited, to the plowed surface layer of soil. Hence, it is apparent that such plants in order to be properly fertilized should be supplied with a material which in solution will not react with the surface layer of the soil to form insoluble substances and thus prevent their leaching into the lower layers, but will have such physicochemical properties in solution as will enable them to remain in solution so as thoroughly to impregnate the lower layers of soil with which the roots are likely to come into contact.

It has been suggested to apply fertilizer to the subsoil by mechanical means, as under pressure through a pipe, around the roots of trees. However, to our knowledge, this problem has never been solved in a chemical manner, by so fabricating a fertilizer chemically that it will penetrate to the subsoil, where the essential element of the fertilizer is of such a type that it will normally react with the surface soil to form an insoluble compound. (By the word "element", as used in the specification and claims, we refer, not to an elemental substance as used in chemical terminology, but to an element of plant nutrition, such as, for example, the $PO_4$, or the $PO_3$, radical.)

It is accordingly an object of our invention to provide new and improved substances which will meet the above noted requirements as soil fertilizers.

It is a further object to provide new and improved methods of producing such substances.

Still another object is to provide new and improved phosphorus compounds which meet these requirements, and improved methods for producing them A further object is to produce new phosphoric esters of polyhydric alcohols and carbohydrates, and improved methods of making such substances.

Various other objects and advantages will become apparent to those skilled in the art as the description proceeds.

In attacking this problem with regard to phosphorus compounds, one of the important classes of soil fertilizers, it was observed that the "reversion" or fixation of mono-calcium phosphate in the soil is due to the fact that it reacts with compounds in the soil to form insoluble phosphates. Knowing that the effect of introducing hydroxyl groups into a molecule is to produce a compound of greater water solubility, we sought potentially cheap polyhydric alcohols with which to form phosphoric acid esters, reasoning that the salts of such esters should be water soluble and therefore not subject to fixation. Moreover, such esters would be less highly ionized than are the inorganic phosphates and might therefore be expected to react less readily with the soil constituents to form insoluble compounds. This reasoning has been justified by our results.

In producing the above mentioned esters, we have adopted novel processes, as follows:

(1) A method consisting in heating a mixture of metaphosphoric acid and a polyhydric alcohol so that the mixture boils but does not char appreciably.

For example: Equal molecular proportions of sorbitol and glacial metaphosphoric acid are placed in an apparatus in which they may be heated and mechanically stirred. Heat is applied gradually until the mixture boils and heating is continued until the temperature of the mixture reaches 200° C. It is kept at 195° C. to 200° C. for about ten minutes longer. The temperature is not allowed to go above this point as a rule, although this is merely a precaution against charring. The mixture is cooled, dissolved in three or four volumes of water, and the acid solution thus obtained is neutralized by milk of lime. The crude product is then evaporated to dryness at steam temperature, or it may be dried in a vacuum at any desired temperature.

(2) A second method consists in dissolving a similar mixture of polyhydric alcohol and metaphosphoric acid in a small quantity of water, and then distilling off the water under reduced pressure at the temperature of boiling water. As in the above example (1), the cooled mixture is dissolved in cold water, neutralized with milk of lime or with calcium carbonate, then evaporated and dried.

(3) A third method consists in dissolving a similar mixture of a polyhydric alcohol and metaphosphoric acid in a small quantity of water, and then heating in an open vessel at the temperature of boiling water for several hours. Solution in cold water, neutralization, and subsequent evaporation and drying are carried out as described above.

The cooled crude reaction product is very soluble in water. When a solution of it of known strength with respect to phosphorus was added to the surface of a cylindrical column of a highly calcareous soil and then the column leached with water, over 60% of the added phosphorus was leached out, although the volume in c.c. of the total leachings was less than the weight in grams of the dry soil used. From other such columns of the same soil to which, individually, solutions containing like amounts of phosphorus in the form of mono-calcium phosphate and of orthophosphoric acid were added, no phosphorus could be leached out. Nor could leaching untreated soil with water alone remove any phosphorus.

In the above example, the proportions of the alcohol and acid are given merely by way of example and are not intended as in any way limiting, since we find that a wide range of proportions may be used. Thus, we may use mixtures of metaphosphoric acid and sorbitol varying in proportion from ten moles of the acid per one mole of sorbitol, to one mole of acid per two moles of sorbitol.

The crude reaction mixture obtained as indicated above is valuable as a fertilizer without any further treatment, since it possesses the desired properties stated above as one of the objects of our invention. However, this crude mixture may, if desired, be refined in order to obtain the constituents thereof in a pure form. To accomplish this, we prefer to proceed as follows:

The concentrated aqueous solution of the reaction mixture is treated with ethyl alcohol until a permanent cloudiness is produced, and then allowed to stand from forty-eight hours to one week. The crystalline product is filtered from the mother liquor and washed with ether, recrystallized in like manner several times, then dried in a vacuum desiccator over sulfuric acid. On evaporating the mother liquor to dryness, other organic phosphorus compounds are obtained.

The crystalline substance thus obtained, in the case where sorbitol was used as the polyhydric alcohol of the initial reaction, corresponds in composition to the sorbitol ester of metaphosphoric acid, that is, sorbityl metaphosphate, $C_6H_{13}O_8P$.

The sorbityl metaphosphate is a very white crystalline solid, having a phosphorus content averaging about 12.57% and remaining granular when kept in a desiccator over sulphuric acid, but becoming slightly sticky or waxy when exposed for some time to the air, probably due to absorption of some moisture. It is extremely soluble in water and darkens slightly when heated to about 245° C. However, it does not melt, or soften appreciably, below 300° C. This ester hydrolizes readily in acid solution. That it is the ester of metaphosphoric acid rather than of the ortho- or pyro-acid seems to be well established by the fact that when a little of the ester is dissolved in a few c.c. of a solution of soluble egg albumen in water and a few drops of glacial acetic acid added, the albumen is immediately coagulated.

Due to the existence of several polymers and also metamers of metaphosphoric acid, we consider it probable that our crude reaction mixtures contain not single compounds but mixtures of them. Furthermore, the several hydroxyls in the polyhydric alcohol molecules make possible a number of isomers. Hence, the isolation and identification of pure compounds from these complex mixtures which make up the crude reaction product is not an easy task, but we feel quite sure of the composition of at least the one mentioned above. This compound we believe to be new with us.

In the reaction outlined above, we may substitute a carbohydrate such as glucose. This also may be used in a wide range of proportions with the metaphosphoric acid. The crude reaction mixture thus obtained is also valuable in itself as a fertilizer and may be refined as indicated above for the sorbitol metaphosphate to obtain what we believe to be glucose dimetaphosphate, $C_6H_{10}O_{10}P_2$, when the meta-acid has been used. This compound is also believed to be new with us.

This substance is also very soluble in water and is a white crystalline solid. It crystallizes from aqueous ethyl-alcohol, as does the sorbitol compound, and does not melt below 300° C. It does not coagulate albumen when hydrolized in acetic acid solution. It gives a yellowish white precipitate with aqueous silver nitrate solution. While the yellow tends to indicate the presence of ortho-phosphoric acid, this test is not clear cut. Judging from its phosphorus content, which is about 19.88%, and from the fact that acid obtained from it by hydrolysis does not coagulate albumen, there is a possibility that this compound is di-glucose di-pyrophosphate, $C_{12}H_{16}O_{18}P_4$.

As a result of the reaction indicated above, starting with metaphosphoric acid, we have evidence that we obtained esters of both ortho- and metaphosphoric acids.

Our process is extremely simple and economical. Crude alcohols or carbohydrates and crude metaphosphoric acid, or other phosphoric acids, can be used as the initial ingredients, and, as stated above, the crude reaction mixture is quite satisfactory as a fertilizer. Such of the constituents as do not react to form a phosphoric ester or esters would in no wise be undesirable in the fertilizer. In fact, the inorganic phosphate in the product would be of value in the fertilizer in the same way as the now known phosphates are of value, like them, being restricted to the surface layer of soil, but undoubtedly becoming available there to the plants' roots feeding in that region.

In addition to the new phosphoric esters described above, we find that esters of orthophosphoric acid and polyhydric alcohols, such as, for instance, glycero-phosphoric acid, or salts of such esters, such as calcium or potassium glycero-phosphate, are eminently qualified to meet the conditions outlined above for fertilizers. Thus, for example, we have used calcium glycero-phosphate in soil penetration tests and in pot culture tests to show the availability to plants of this form of phosphorus. The results have been very satisfactory.

It will be understood that the initial phosphoric acid used in our process outlined above may be either ortho-, meta- or pyro-, and may be in the crude form.

While we have described our invention particularly in connection with phosphorus compounds, we wish it to be understood that we do not consider our invention as limited to such substances, but to any element of plant nutrition which ordinarily reacts with the top soil to form insoluble compounds.

Various other modifications and variations of our invention will doubtless occur to those skilled in the art, and hence we do not wish to be limited to the specific substances or methods disclosed herein, except as indicated in the appended claims, which are to be interpreted as broadly as the state of the art will permit.

We claim as our invention:

1. A process of sub-soil fertilization comprising incorporating in the top soil a composition comprising a phosphorus radical which would ordinarily react with the soil to form an insoluble compound, said radical being chemically combined with an aliphatic residue containing a plurality of hydroxyl groups to form a water soluble compound which will retain its water solubility in contact with the soil until it reaches the subsoil, and in which said radical will be nutritionally available to plant roots.

2. A process of sub-soil fertilization comprising incorporating with the top soil a reaction product resulting from chemically reacting upon an aliphatic compound having a plurality of hydroxyls with an acid of phosphorus.

3. A process of sub-soil fertilization comprising incorporating with the top soil a reaction product resulting from chemically reacting upon a carbohydrate with an acid of phosphorus.

4. A process of sub-soil fertilization comprising incorporating with the top soil a reaction product resulting from chemically reacting upon sorbitol with metaphosphoric acid.

5. A process of sub-soil fertilization comprising incorporating with the top soil a reaction product resulting from chemically reacting upon sorbitol with metaphosphoric acid at an elevated temperature and neutralizing the product with lime.

6. A process of sub-soil fertilization comprising incorporating with the top soil a reaction product resulting from chemically reacting upon glucose with metaphosphoric acid.

7. A process of sub-soil fertilization comprising incorporating with the top soil a reaction product resulting from chemically reacting upon glucose with metaphosphoric acid at an elevated temperature and neutralizing the product with lime.

8. A process of sub-soil fertilization comprising incorporating with the top soil calcium glycerophosphate.

9. A process of sub-soil fertilization comprising incorporating with the top soil a crude reaction mixture resulting from chemically reacting upon an aliphatic compound having a plurality of hydroxyls with an acid of phosphorus, and then adding sufficient alkali to neutralize the product.

ROBERT STEWART.
VICTOR E. SPENCER.